(12) United States Patent
Knapper

(10) Patent No.: US 11,938,903 B1
(45) Date of Patent: Mar. 26, 2024

(54) VEHICLE CARGO LIFT

(71) Applicant: Daniel Knapper, Clarkston, MI (US)

(72) Inventor: Daniel Knapper, Clarkston, MI (US)

( * ) Notice: Subject to any disclaimer, the term of this patent is extended or adjusted under 35 U.S.C. 154(b) by 154 days.

(21) Appl. No.: 17/390,834

(22) Filed: Jul. 30, 2021

(51) Int. Cl.
*B60R 9/042* (2006.01)
(52) U.S. Cl.
CPC .................................... *B60R 9/042* (2013.01)
(58) Field of Classification Search
CPC .......... B60R 9/042; B60R 9/04; B60R 9/0426
USPC ....................................................... 224/310
See application file for complete search history.

(56) References Cited

U.S. PATENT DOCUMENTS

| | | | | |
|---|---|---|---|---|
| 3,608,759 A * | 9/1971 | Spurgeon | ............... | B60R 9/0426 414/542 |
| 3,715,044 A * | 2/1973 | Simons | ...................... | B60P 3/38 224/328 |
| 3,809,425 A * | 5/1974 | Blaschke | ................ | B60R 9/045 224/310 |
| 3,823,839 A * | 7/1974 | Petzing | ................ | A61G 3/0209 414/541 |
| 3,878,955 A * | 4/1975 | Udden | ................. | A61G 3/0209 224/310 |
| 4,039,096 A * | 8/1977 | McAllister | ............ | B60R 9/0426 224/310 |
| 4,081,095 A * | 3/1978 | Wilburn | ................... | B60R 9/042 414/522 |
| 4,113,127 A * | 9/1978 | Clement | ............... | B60R 9/0426 414/462 |
| 4,134,509 A * | 1/1979 | Clement | ............... | A61G 3/0209 224/310 |
| 4,236,860 A * | 12/1980 | Gottlieb | ............... | A61G 3/0209 414/742 |
| 4,242,030 A * | 12/1980 | Clement | ............... | B60R 9/0426 224/310 |
| 4,245,947 A * | 1/1981 | Clement | ............... | B60R 9/0426 224/310 |
| 4,260,314 A * | 4/1981 | Golze | ..................... | B60R 9/042 224/310 |
| 4,329,100 A * | 5/1982 | Golze | ..................... | B60R 9/042 224/310 |
| 4,339,223 A * | 7/1982 | Golze | ..................... | B60R 9/042 224/310 |
| 4,439,086 A * | 3/1984 | Thede | ....................... | B60R 9/08 224/310 |
| 5,154,563 A * | 10/1992 | Phillips | ................. | B60R 9/0426 224/326 |
| 5,346,355 A * | 9/1994 | Riemer | ................... | B60R 9/042 224/310 |
| 5,544,796 A * | 8/1996 | Dubach | ................... | B60R 9/042 224/310 |
| 5,975,830 A * | 11/1999 | Goodrich | ............... | A61G 3/062 414/812 |

(Continued)

*Primary Examiner* — Peter N Helvey
(74) *Attorney, Agent, or Firm* — Harness, Dickey & Pierce, P.L.C.

(57) ABSTRACT

A vehicle cargo lift includes a stationary slide adapted to be mounted on a roof of a vehicle. The cargo lift is automatically extended to a position for easily loading cargo onto the lift and is automatically retractable to a position on top of the vehicle roof. A rolling slide is slidably mounted to the stationary slide and a rear tray is movably supported by the rolling slide. A front tray is supported by the rear tray via a pair of elbow arm assemblies that are extendable below the rear tray.

20 Claims, 14 Drawing Sheets

(56) References Cited

U.S. PATENT DOCUMENTS

| | | | | |
|---|---|---|---|---|
| 6,428,263 | B1* | 8/2002 | Schellens | B60R 9/042 224/310 |
| 7,033,128 | B2* | 4/2006 | Poindexter | B60P 1/4414 414/544 |
| 7,048,490 | B2* | 5/2006 | Henderson | B60R 9/042 224/310 |
| 8,322,580 | B1* | 12/2012 | Hamilton | B60R 9/055 224/310 |
| 9,914,400 | B1* | 3/2018 | Johnsrud | B60R 9/058 |
| 2004/0028510 | A1* | 2/2004 | Jones | B60R 9/042 414/462 |
| 2006/0133914 | A1* | 6/2006 | Derks | B60R 9/055 414/462 |
| 2023/0050631 | A1* | 2/2023 | Wang | B60R 9/045 |
| 2023/0082917 | A1* | 3/2023 | Guo | B60R 9/042 414/812 |

* cited by examiner

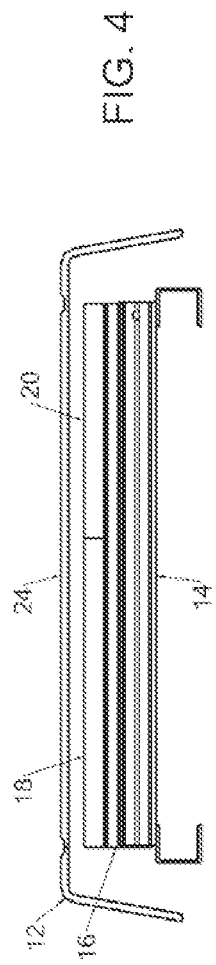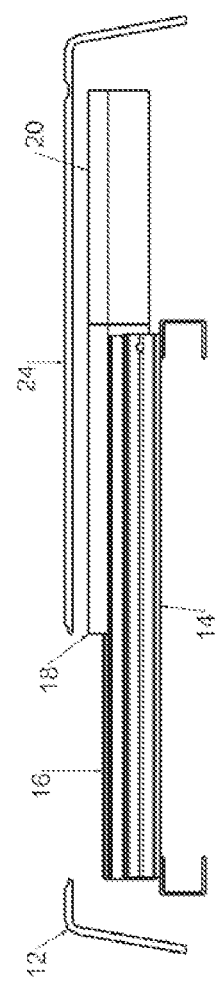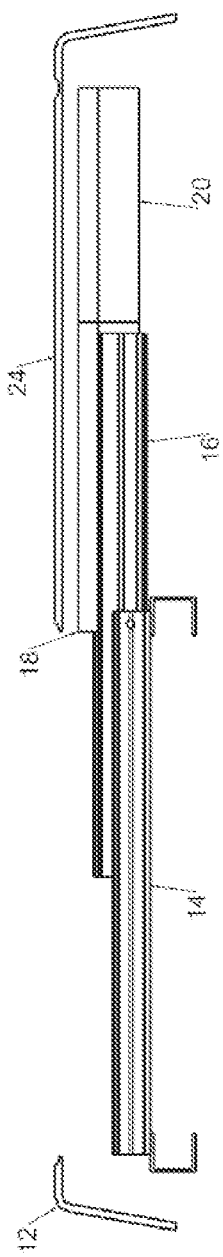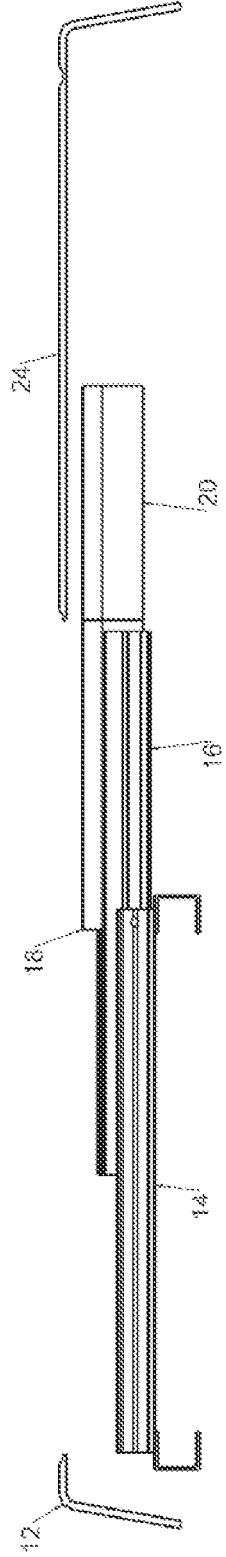

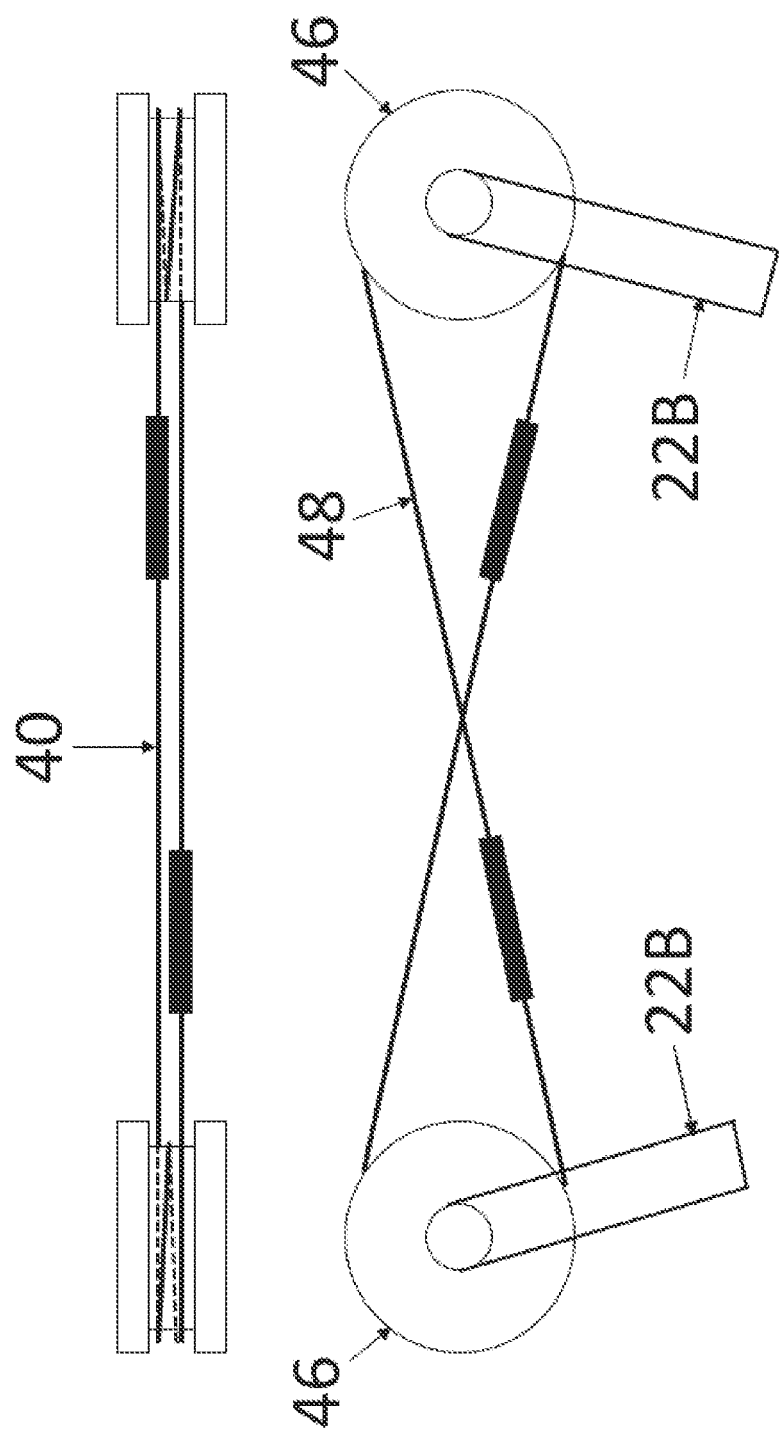

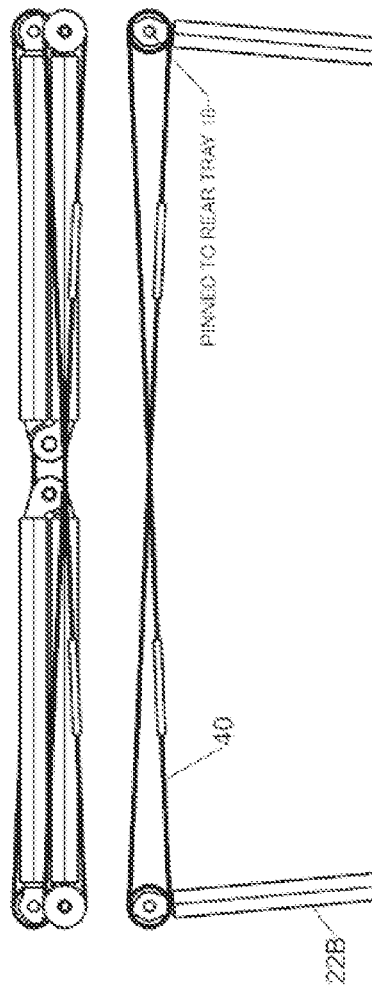
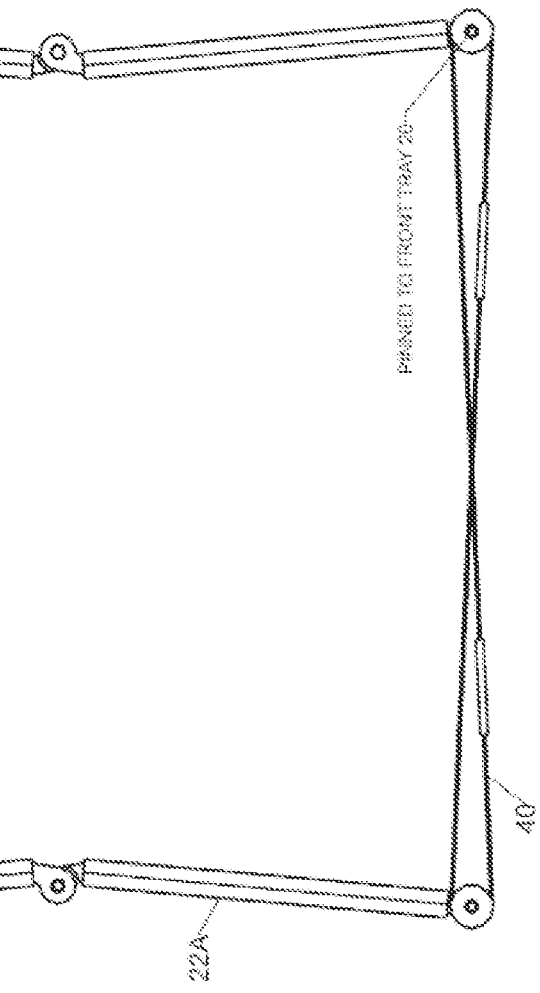
FIG. 10a
FIG. 10b

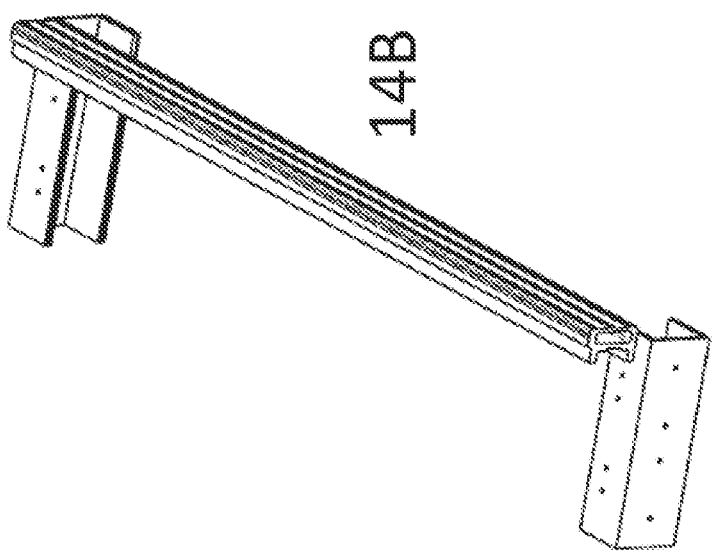
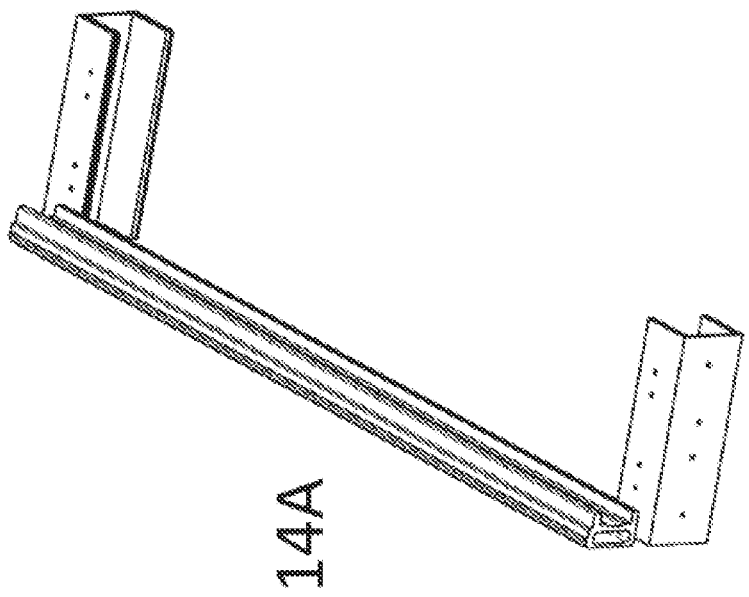
FIG. 12

VEHICLE CARGO LIFT

FIELD

The present disclosure relates to a vehicle cargo lift.

BACKGROUND

This section provides background information related to the present disclosure which is not necessarily prior art.

Existing roof top cargo carriers are difficult to access especially if the vehicle is tall and wide and, depending on the cargo, it is difficult to safely secure the cargo to the cargo carriers. There is also an element of personal physical injury risk from lifting heavy objects above and away from one's body or using a ladder to reach the top of the vehicle effectively. Securing skis, snowboards, bikes, kayaks, ladders, etc. to the roof of a vehicle is a challenge. Part of the difficulty is because of the lack of reach & accessibility. To avoid scratching or even denting the vehicle while unloading/loading is of concern and is compounded when lifting heavy, awkwardly shaped objects above waist height away from one's body. Current cargo carriers are manually operated which renders them more difficult and/or even impractical to use especially if the cargo is heavy or unwieldly.

SUMMARY

This section provides a general summary of the disclosure and is not a comprehensive disclosure of its full scope or all its features.

The vehicle cargo lift according to the present disclosure allows cargo to be safely and more easily stowed above the vehicle by lowering the storage surface to a more accessible location on the side of the vehicle. The mechanical and electromagnetic systems facilitate this at the push of a button.

The vehicle cargo lift according to the present disclosure is a more convenient vehicle roof mounted cargo system than currently exists today. This invention allows for mounting practically any storage type device, i.e., a "turtle shell" or basket for luggage, or other storage system to a platform that is mechanically moved off the roof and down to the side of the vehicle for easy access and removal/loading. With the cargo secured, the platform is electro-mechanically retracted back onto the roof with the push of a button.

An additional possible use is the platform as a "table" in the down position at tailgate parties or when camping. The possibilities are wide reaching. Securing anything within reason to the platform within the recommended height and weight limits, and not considered a road hazard, is now possible with the vehicle cargo lift of the present disclosure.

The cargo lift of the present disclosure is scalable from the smallest to the largest vehicles on the road. In general terms, it is the combined horizontal length of the cargo lift arms in the home position which dictates the vertical distance that the platform can travel. In other words, the combined length of the elbow arm segments measuring three feet horizontally will lift a platform approximately three feet vertically. Subsequently a four-foot system will lift a platform approximately four feet; five feet horizontally translates to approximately five feet vertically, etc.

The vehicle cargo lift includes a stationary slide which is fixed to the vehicle roof, a rolling slide movable relative to the stationary slide, a rear tray and a front tray that are both movable relative to the rolling slide, a pair of elbow arm assemblies connected to the rear tray and the front tray and a platform movable relative to the front tray. The horizontal motion of the top platform is driven by two independent push/pull cable systems. A first spool system is located at an end of the rear tray for horizontal movement of the rear tray 18, a second spool system is at an intermediate location along the rear tray for vertical motion of the front tray and top platform, and a third spool system is positioned in the front tray to drive the top platform horizontally relative to the front tray. The spools are in a push/pull arrangement for winding and unwinding cables/straps/belts that are driven by electric motors to facilitate operation of the cargo lift between the various positions. The first and third spools are dedicated to horizontal motion and utilize a single motor per axle. The second spool system includes two coaxially spaced spools that are dedicated to the vertical motion and utilizes a motor for driving a single axle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIG. 4 is a schematic view of the cargo lift in a retracted position;

FIG. 5 is a schematic view of the cargo lift in a partially extended position with a rolling slide, a rear tray, a front tray and a platform horizontally extended relative to a stationary slide;

FIG. 6 is a schematic view of the cargo lift with the rear tray, front tray and platform horizontally extended relative to the rolling slide;

FIG. 7 is a schematic view of the cargo lift with the platform horizontally extended relative to the front tray;

FIG. 9 is a schematic view of an anti-sway system of the elbow arm system;

FIG. 10a is a schematic view of the elbow arm system in the retracted position;

FIG. 10b is a schematic view of the elbow arm system in the fully extended position;

FIG. 12 is a schematic view of the frame for the stationary slide rail;

Corresponding reference numerals indicate corresponding parts throughout the several views of the drawings.

DETAILED DESCRIPTION

Example embodiments will now be described more fully with reference to the accompanying drawings.

With reference to FIG. 1a, a Vehicle 10 is shown having a Cargo Lift 12 mounted on the roof of the Vehicle 10. The Cargo Lift 12 includes a Stationary Slide Rail 14 that is fixedly mounted to the vehicle roof. A Intermediate Slide Rail 16 is slidably mounted to the Stationary Slide Rail 14. A Rear Tray 18 is further movably supported by the Intermediate Slide Rail 16 and a Front Tray 20 is supported by the Rear Tray 18 via a pair of Elbow Arm Assemblies 22A, 22B. A Top Platform 24 is mounted to the Front Tray 20.

Figure 1:
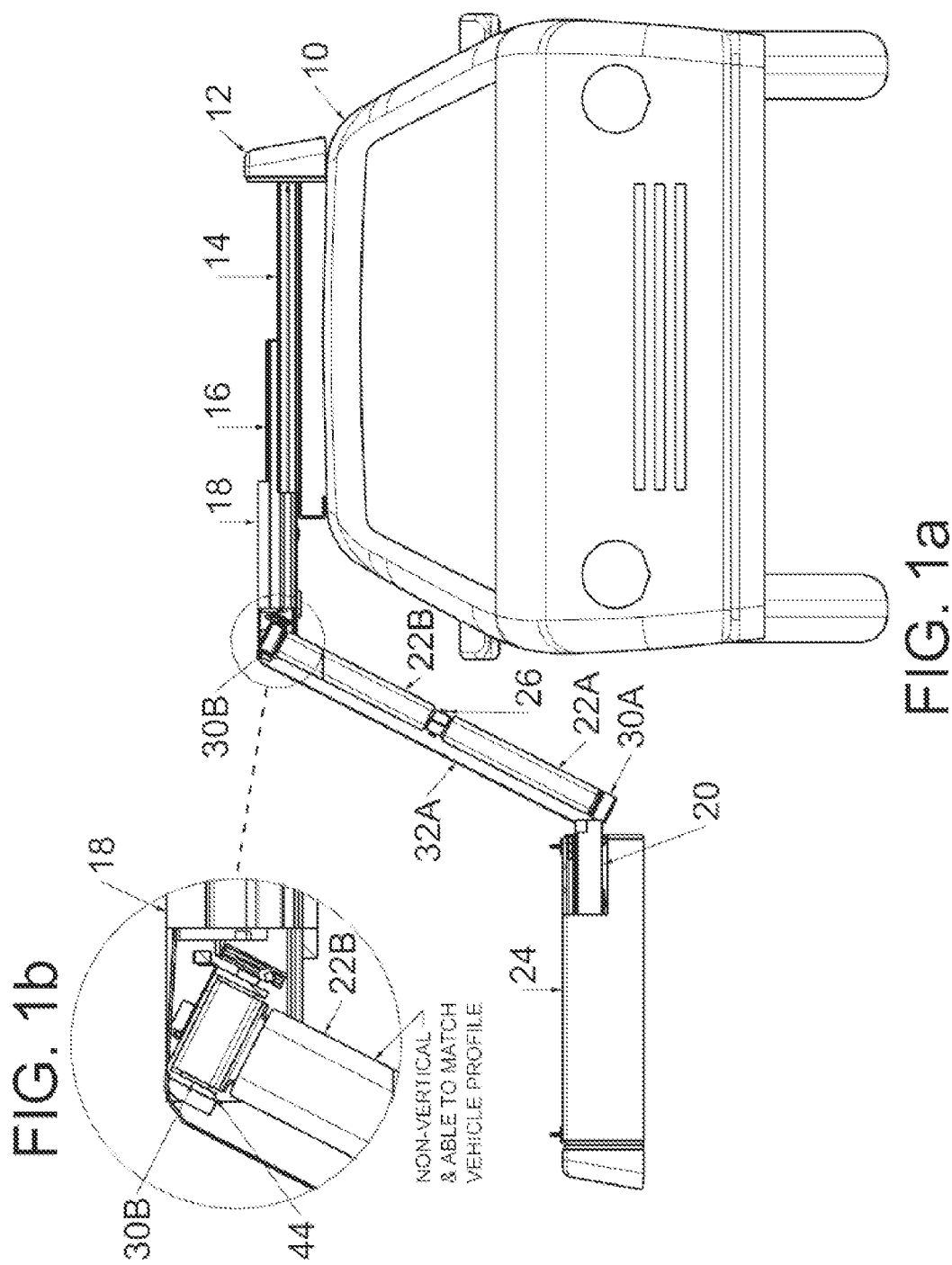
FIG. 1a is a front view of a vehicle and cargo lift in the fully extended position according to the principles of the present disclosure.
FIG. 1b is a detailed front view of an upper elbow arm joint of the vehicle cargo lift in the fully extended position detailing the deployment angle according to the principles of the present disclosure.
Figure 2:
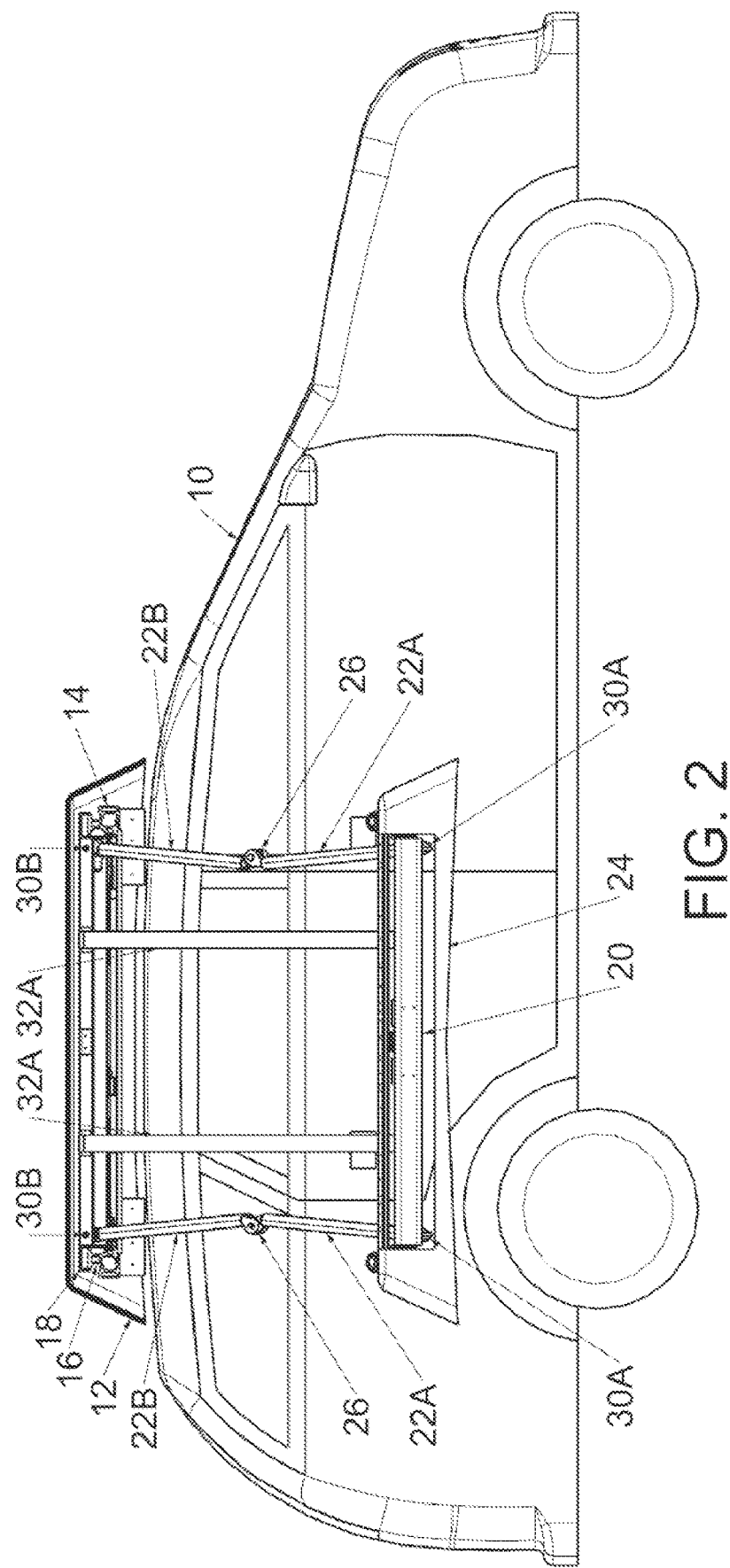
FIG. 2 is a side view of a vehicle and cargo lift in a fully extended position according to the principles of the present disclosure.

With reference to FIGS. 1 and 2, the Intermediate Slide Rail 16 and Rear Tray 18 of the Cargo Lift 12 can be extended outward from the Stationary Slide Rail 14 and the pair of Elbow Arm Assemblies 22A, 22B can be extended downward from the Rear Tray 18 so that the Front Tray 20 can be extended beyond an edge of the vehicle roof and lowered to an easily accessible level next to the Vehicle 10, as shown in FIGS. 1 and 2. In each of the Elbow Arm Assemblies, 22A&22B, the lower Elbow Arm 22A is connected to the Upper Elbow Arm 22B by a Hinge Joint 26. The pair of Lower Elbow Arms 22A is connected by a Lower Hinge Joint 30A to the front Tray 20. The pair of Upper Elbow Arms 22B is connected by an upper Hinge Joint 30B to the Rear Tray 18. With reference to FIG. 1b, the angular orientation of the upper Hinge Joint 30B dictates the angular deployment direction of the Front Tray 20 along a side of the Vehicle 10.

Figure 3:
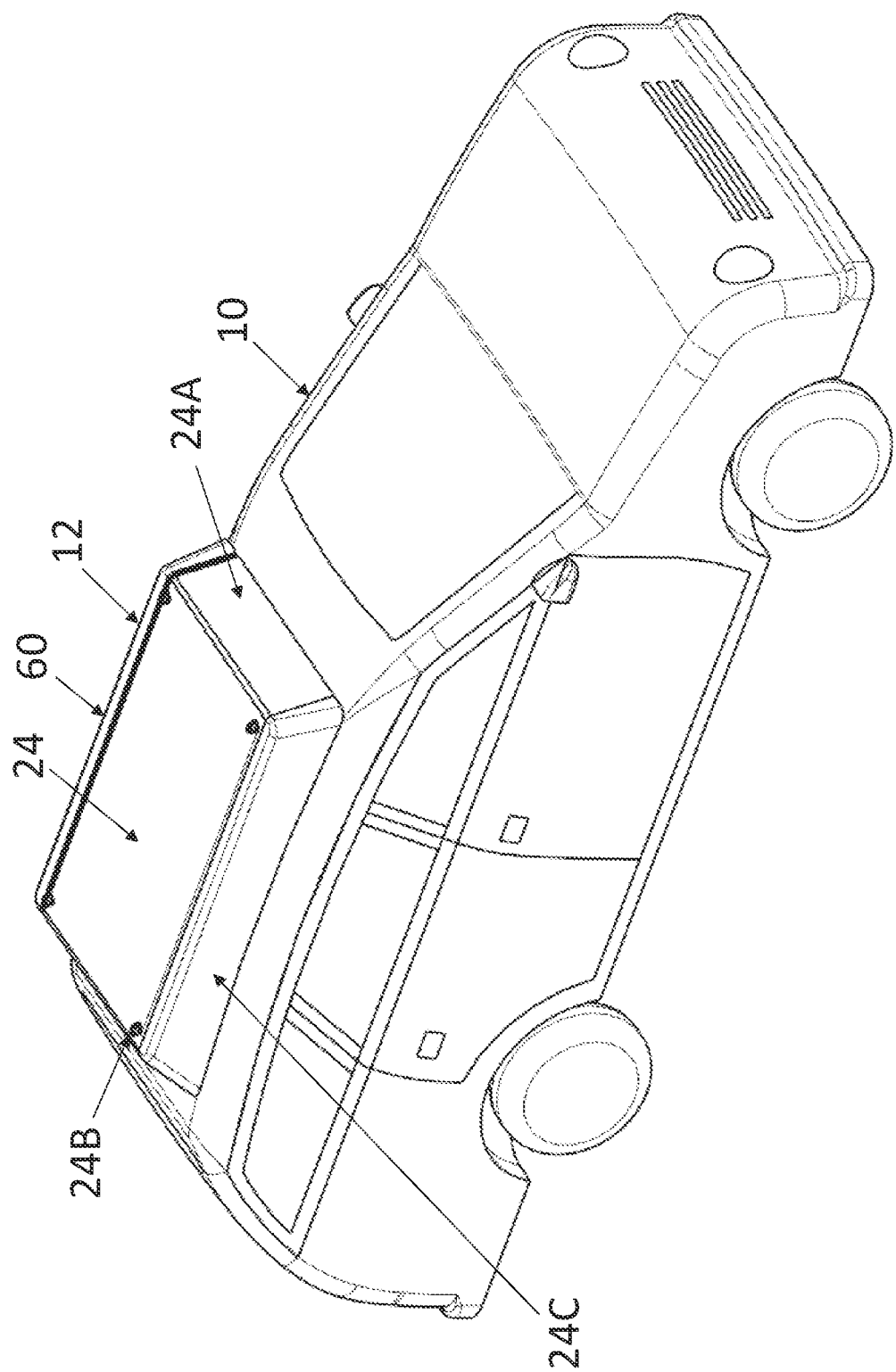
FIG. 3 is a perspective view of the cargo lift in a retracted position on top of a vehicle.

With reference to FIG. 3, the Cargo Lift 12 is shown in a fully retracted position with the Intermediate Slide Rail 16, the Rear Tray 18, the pair of Elbow Arm Assemblies 22A, 22B, the Front Tray 20 and the Top Platform 24 all retracted relative to the Stationary Slide Rail 14. The Cargo Lift 12 is operable in the retracted position shown in FIG. 3 to support or store items on top of the Vehicle 10 when the vehicle is being driven. The Cargo Lift 12 is extendable to the position shown in FIGS. 1 and 2 along a side of the Vehicle 10 so that items can be easily mounted or stored on the Top Platform 24 by a person standing on the ground. The Cargo Lift 12 is automatically operable between the retracted position (shown in FIG. 3) and the extended (loading) position (shown in FIGS. 1 and 2) and vice versa by electric motor driven operation, as will be described in further detail herein.

FIGS. 4-7 illustrate a series of operation stages for extending the Top Platform 24 from the retracted position (FIG. 3) to the loading position (FIGS. 1 and 2). With reference to FIG. 4, each of the Intermediate Slide Rail 16, the Rear Tray 18, the Front Tray 20 and Top Platform 24 are shown in the retracted position corresponding to FIG. 3. With reference to FIG. 5, the Rolling Slide 16 remains nested in the home position. The Rear Tray 18, Front Tray 20 and Top Platform 24 move outward along the Intermediate Slide Rail 16 until the Rear Tray 18 reaches the end of its travel in the Intermediate Slide Rail 16. With reference to FIG. 6, the Rear Tray is shown further extended outward, now pulling with it the Intermediate Slide Rail 16 until it is extended approx. 50% from its home position when both the Intermediate Slide Rail 16 and the Rear Tray 18 reach their travel limits due to internal stops within the rails.

With reference to FIG. 7, the Top Platform 24 is shown extended outward over top of the Front Tray 20. From the position shown in FIG. 7, the Elbow Arm Assemblies 22A, 22B that are connected between the Rear Tray 18 and the Front Tray 20 are extended to the position shown in FIGS. 1 and 2 and thereby lower the Front Tray 20 and Top Platform 24 relative to the Rear Tray 18.

Figure 8:
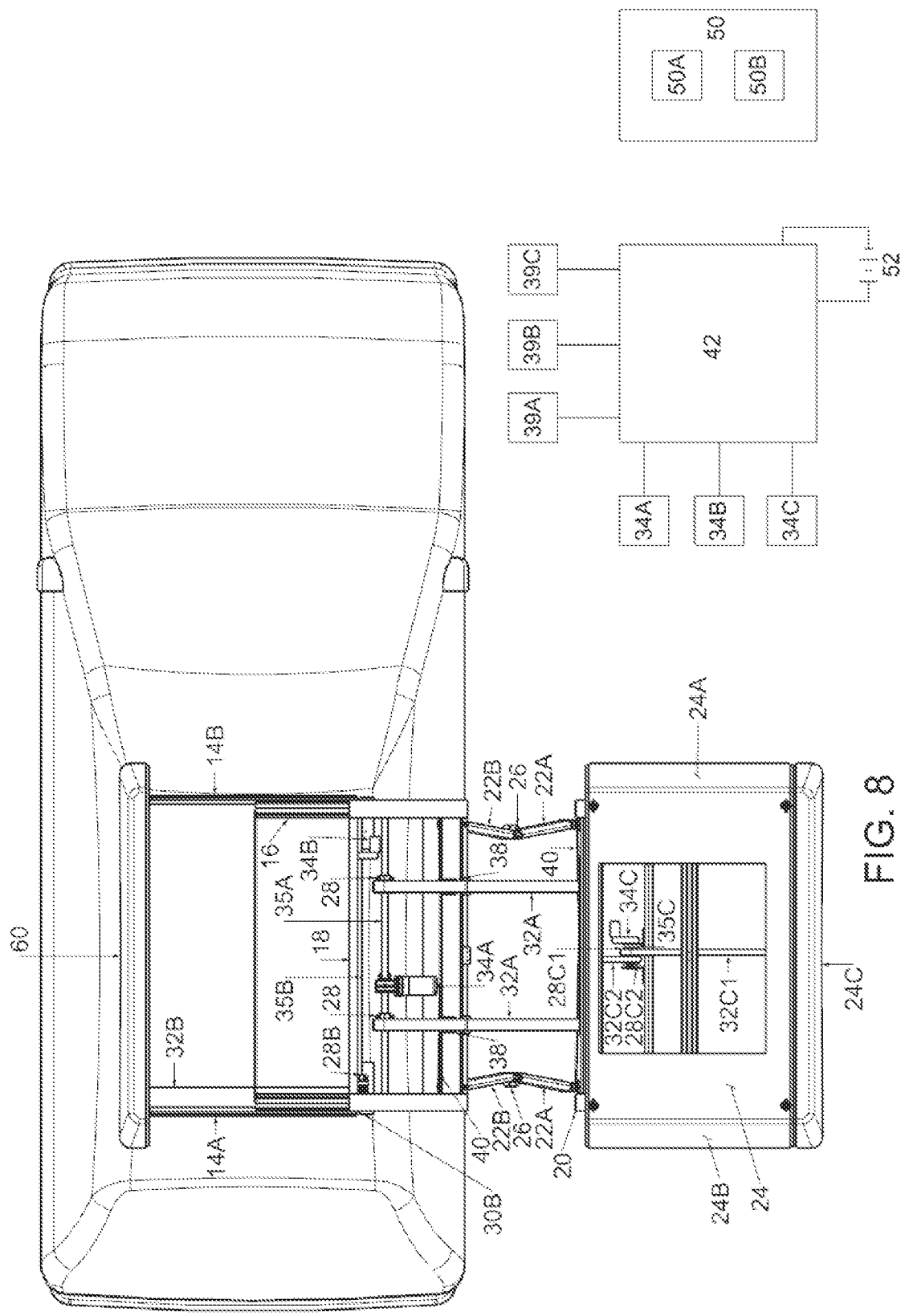
FIG. 8 is a top plan view of the cargo lift in an extended position with parts of the components cut-away for illustrating the drive system for automatically extending and retracting the cargo lift.

With reference to FIG. 8, the drive system for automatically operating the Cargo Lift 12 between the extended and retracted positions will now be described.

The horizontal motion (FIGS. 4-7) is performed by a horizontal slide/deployment system that can employ two (2) dedicated motor, axle, spool and cable/strap/belt assemblies applied to both the Front Tray 20 and Rear Tray 18. The vertical motion of the Top Platform 24 vertically downward along a side of the Vehicle 10 is achieved by a single dedicated motor, axle, spool and cable/strap/belt assembly.

To elaborate, the horizontal motion of the Rear Tray 18, illustrated in FIGS. 4-7, is achieved by a cable/strap push-pull arrangement, best shown with reference to FIG. 8, which can include a Motor 34B, Axle 35B, Spool 28B and Strap 32B. The Axle 35B is fixed to the Rear Tray 18 by means of a supporting frame member that rotatably supports the Axle 35B. It should be understood that the Strap 32B is anchored to Stationary Slide Rail 14. By virtue of the Motor 34B, Axle 35B, Spool 28B and Strap 32B that are drivingly connected to the Rear Tray 18, when the Motor 34B is energized and the Spool 28B rotates, the rotation necessarily pulls the Rear Tray 18 in the horizontal direction of Strap 32B take up, relative to the Stationary Slide Rails 14A, 14B.

Figure 17B:
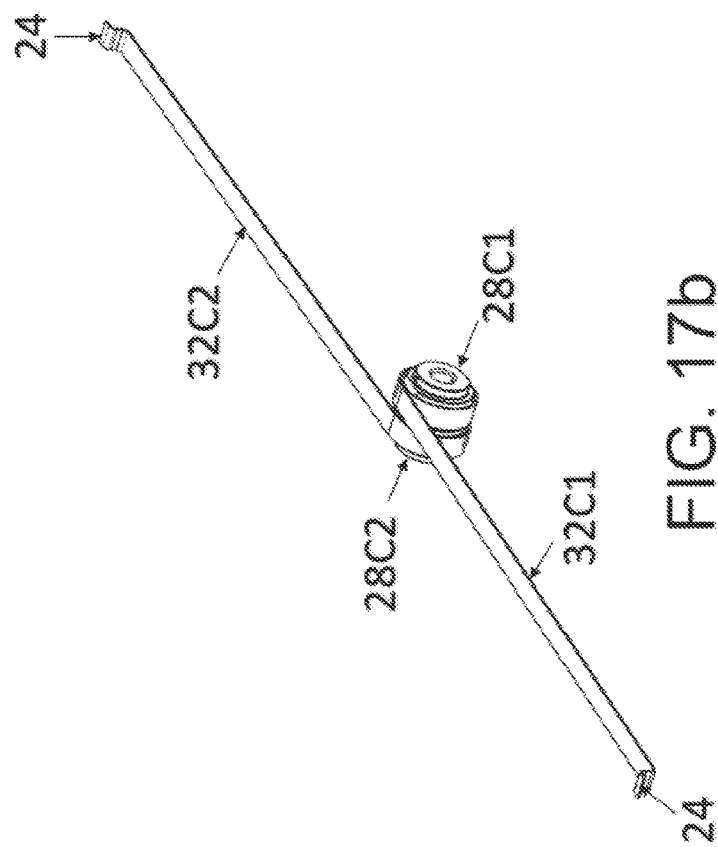
FIG. 17b is a schematic view of alternative spool push-pull system according to an aspect of the present disclosure.
Figure 17A:
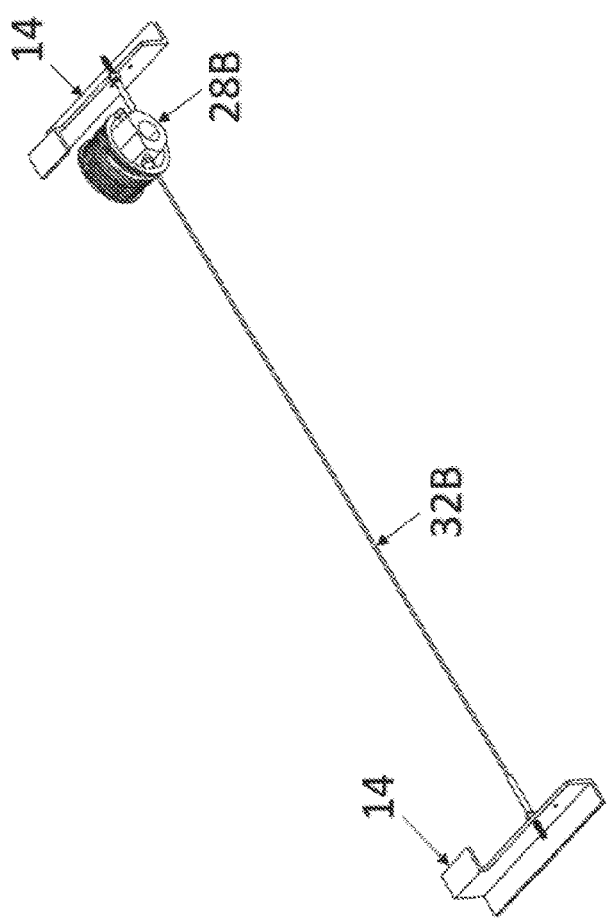
FIG. 17a is a schematic view of spool push-pull system according to an aspect of the present disclosure.

The attachment endpoints for the Straps 32B for the horizontal push-pull motion for the Rear Tray 18 are located on the Stationary Slide Rail 14 at the side corners of the Vehicle 10. The Cable Strap 32B is secured to the Stationary Slide Rail 14 at one side of the vehicle, wound over the Spool 28B and then attached to the Stationary Slide Rail 14 at the opposite side of the vehicle. By way of example, as shown in FIG. 17a, the push-pull motion can be achieved by the use of a single Spool 28B with a helical groove and a cable which is connected to the Stationary Slide Rail 14 at opposite ends. As an alternative, as shown in FIG. 17b, the push-pull motion can be achieved by two Spools 28C1, 28C2 each with a separate Strap 32C1, 32C2 (shown in the form of a belt) connected to the frame on opposite sides and wound in opposite directions. The Motor 34B, Axle 35B and Spool 28B assembly is fixed to the Rear Tray 18 by means of a supporting frame member fixed to the Rear Tray 18. By means of taking up or releasing the Cable Strap 32B from the Spool 28B which is rotated by means of the Axle 35B driven by the Motor 34B, the Rear Tray 18 moves horizontally in relation to the Stationary Slide Rail 14A, 14B. Switching the polarity to the Motor 34B reverses the rotational direction of the Spool 28B which reverses the direction of the horizontal motion in a push-pull motion.

The horizontal motion of FIG. 7, which is the Top Platform 24 moving over top of the Front Tray 20, is achieved by Motor 34C, single Axle 35C and Spool 28C with a push-pull arrangement particular to the Front Tray 20 and Top Platform 24. This Motor 34C, single Axle 35C, Spool 28C and Strap 32C arrangement is mounted in the Front Tray 20 frame by its own supporting frame member and adds structural integrity to the Front Tray 20. The Axle 35C is also attached to the Front Tray 20 by means of bearings fastened to the side plates of Front Tray 20. The endpoints of this push-pull system are the frame members of the Front Tray 20 which are parallel to the sides of the vehicle.

It should be understood that the Straps 32A, 32B, 32C can be in the form of fabric strips, ropes, cables, chains and belts and that the term "strap" is used herein for simplicity to include any of these forms of flexible connector. In addition, the Motors 34A, 34B, 34C can include a geared drive connection to the Axles 35A, 35B, 35C, respectively.

By virtue of stops incorporated into the Stationary Slide Rail 14A and 14B, the Intermediate Slide Rail 16 is pulled to the fully retracted position atop the vehicle or pulled to the full extension position horizontally by the Rear Tray 18. The Intermediate Slide Rail 16 movement is captured within the constraints of stops built into the Stationary Slide Rails 14A and 14B. It is the Intermediate Slide Rail 16 that provides the bridged support from the Stationary Slide Rails 14A and 14B to the Rear Tray 18. By virtue of the Motor 34B, Axle 35B, Strap 32B, & Spool 28B being affixed to the Rear Tray 18 and directly moving the Rear Tray 18 by means of the push-pull system in relationship to the Stationary Slide Rails 14A, 14B, the Rear Tray 18 can necessarily pull the Intermediate Slide Rail 16 in and out as its own supporting structure beneath it.

Vertical downward motion of the Front Tray 20 and Top Platform 24 is simply provided by gravitational pull on the Front Tray 20 and Top Platform 24. There is no mechanical force added to the gravitational force for downward vertical motion. However, the Motor 34A, Axle 35A, Spools 28A and Straps 32A assembly is energized, meaning that the Motor 34A is running to control the rate of travel in which the Front Tray 20 and Top Platform 28 lower, unwinding the Straps 32A which connect the Front Tray 20 to the Rear Tray 18 allow the extension of the pair of Elbow Arm Assemblies 22A & 22B about the intermediate Hinge Joints 26.

The vertical motion of raising the Top Platform 24 is achieved by use of Motor 34A directly driving the Axle 35A which is common to two Spools 28A that are fixed to the Rear Tray 18, for winding up the Straps 32A attached to the Front Tray 20. The Motor 34A, Axle 35A, Spools 28A and Straps 32A assembly is fixed to the Rear Tray 18 by means of a supporting frame member which is a part of the Rear Tray 18 overall structure. The direction of the platform travel is controlled by switching the voltage polarity to the Motor 34A which reverses the direction of rotation of the Spools 28A for winding/up or unwinding/down.

The travel from the home position atop of the vehicle to the fully down, loading position has a definite sequence in staging which system of motor, axle, spool(s) and strap(s) are actuated. When moving from off the top of the Vehicle 10, the horizontal travel of both extending the Rear Tray 18 to its full extent in relation to the Intermediate Slide Rail 16 is necessary, and the horizontal movement of the Top Platform 24 must also travel to its full extension outboard in relationship to the Front Tray 20. These two horizontal motions must be complete before vertical movements can commence. It is only when the Top Platform 24 is fully extended out from the Vehicle 10 in both the relationships of the Rear Tray 18 to the Intermediate Slide Rail 16, and then also the Top Platform 24 to the Front Tray 20, is the vertical Motor 34A, Axle 35A, Spools 28A and Straps 32A enabled electrically to move the Front Tray 20 and Top Platform 24 up or down.

Conversely, when the platform is in its full extended position horizontally and lowered/loading position vertically (FIGS. 1, 2), the Motors 34B, 34C, Axles 35B, 35C and Spools 28b, 28C associated with the horizontal motion are locked out until the Top Platform 24 and Front Tray 20 is fully raised from the lowered/loading position by activation of the Motor 34A, Axle 35A and Spool 28A. These lockout features of vertical and horizontal motions to achieve proper sequencing of operation are achieved by a switching Control Unit 42 (FIG. 8) which is connected to each of the Motors 34A, 34B and 34C and to the vehicle battery or other auxiliary battery source. A Remote Control Unit 50 can be provided for sending control signals to the Control Unit 42 for actuating the Motors 34A, 34B, 34C for extending or retracting the cargo lift 12. The Remote Control Unit 50 can provide wired or wireless communication to the Control Unit 42 and can include an "UP" button 50a and a "DOWN" button 50b. Optionally, a "STOP" button could also be utilized.

The two Stationary Slide Rails, 14A and 14B (FIG. 12), are fixed to the vehicle in parallel and provide the full loadbearing structure of the entire Cargo Lift 12. They provide structure directly for the Intermediate Slide Rail 16A, 16B to move to a midpoint of travel within the Stationary Slide Rails 14A and 14B for support of the Rear Tray 18.

Figure 13:
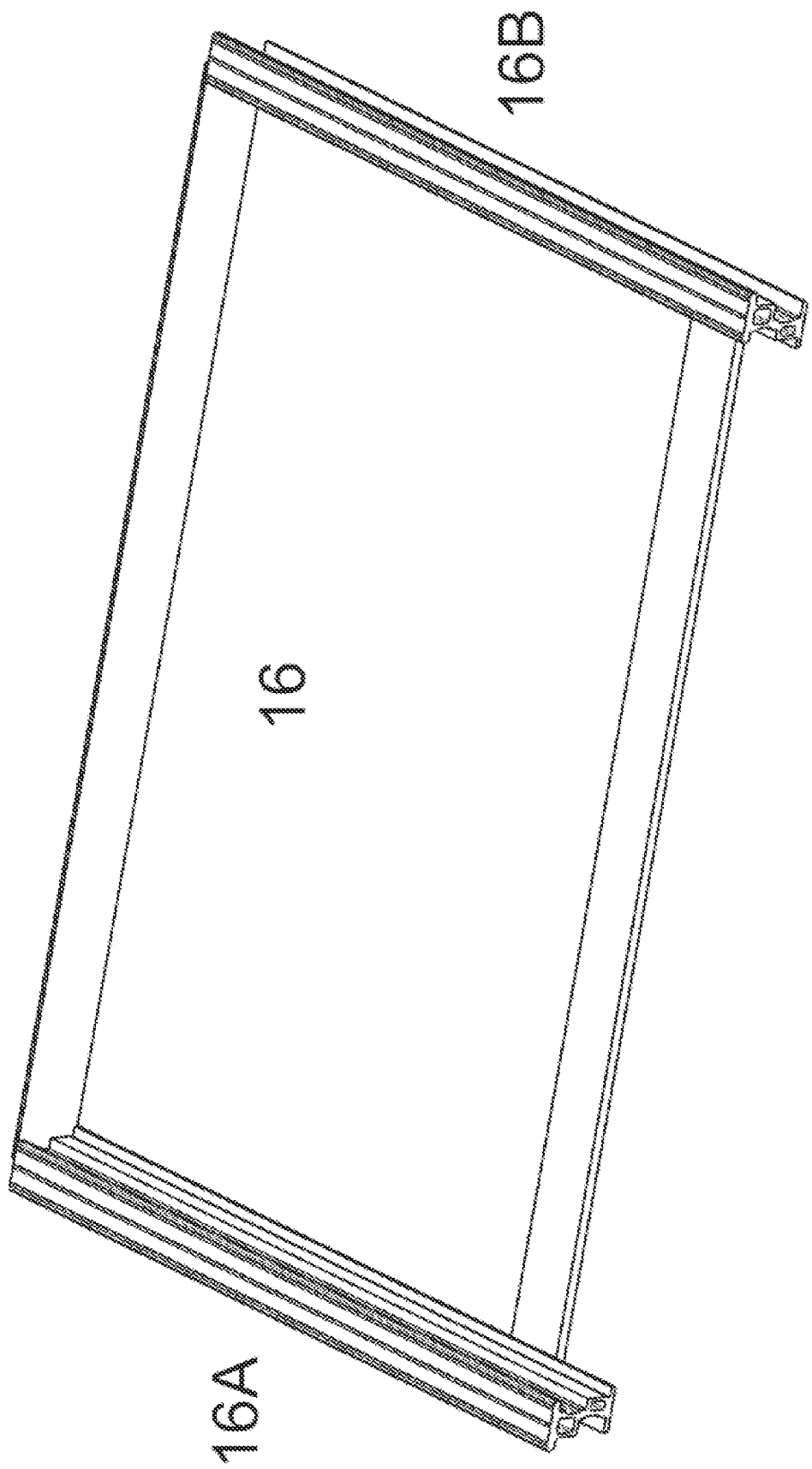
FIG. 13 is a schematic view of the frame for the intermediate slide rail.

The Intermediate Slide Rail 16 (FIG. 13) is the frame structure which directly supports the Rear Tray 18. It is composed of 2 parallel slide members held fixed in space in relationship to each other by two horizontal cross members forming a rectangular frame. The Intermediate Slide Rail 16 is captured by the Stationary Slide Rails 14A and 14B with physical stops arranged to capture its movement from the completely retracted position atop of the vehicle to a midpoint in which the Intermediate Slide Rail 16 is extending out from the vehicle approximately half its length.

The movement of the Intermediate Slide Rail 16 is dependent upon the Rear Tray 18 directly driven by the push-pull system arrangement in the Rear Tray 18. It is when the Rear Tray 18 is moved outboard of the vehicle that it necessarily pulls with this movement the Intermediate Slide Rail 16 as the Rear Tray 18 is prevented from extending out past the front limits of the Intermediate Slide Rail 16. When the Rear Tray 18 is fully extended outboard of the Vehicle 10, this movement pulls the Intermediate Slide Rail 16 to its fully extended position. To clarify, it is the movement of the Rear Tray 18 that pulls the Intermediate Slide Rail 16 in and out.

Figure 15:
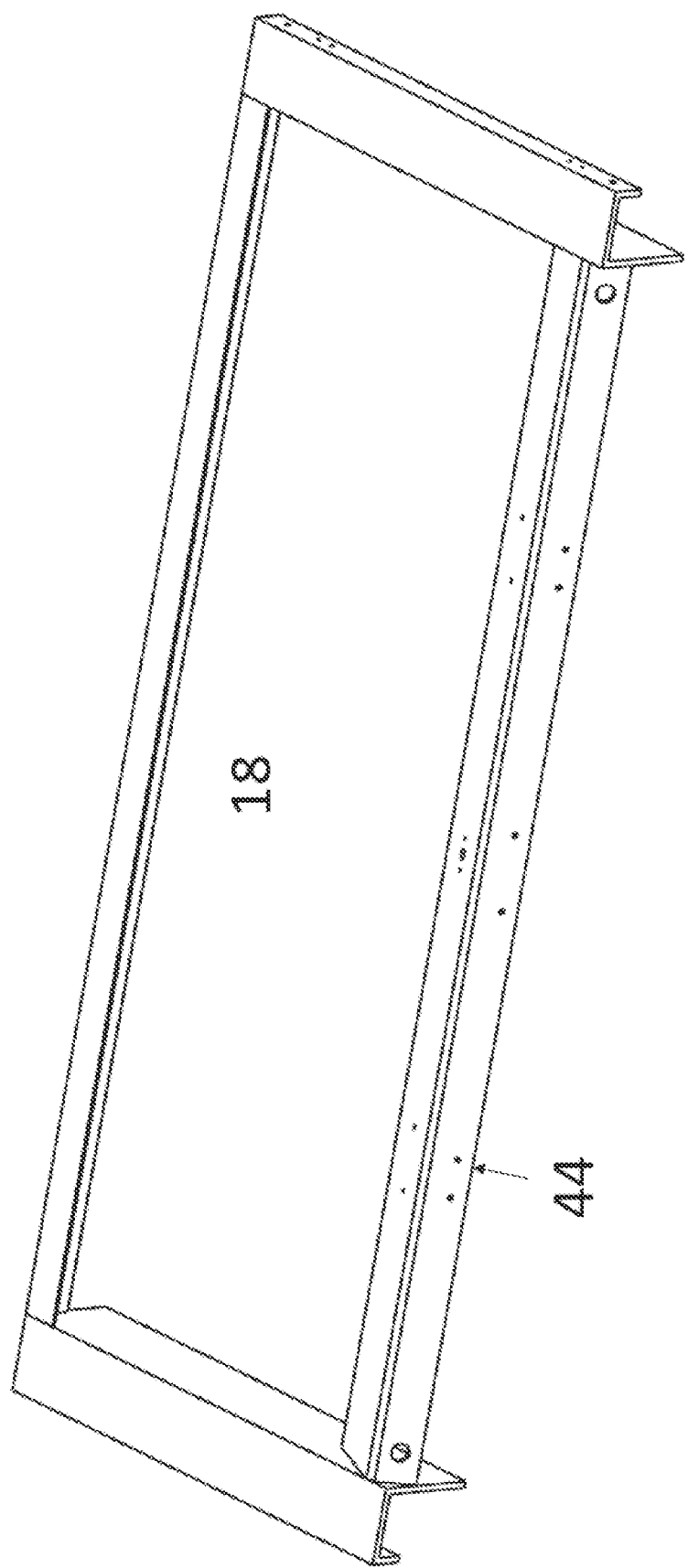
FIG. 15 is a schematic view of the frame for the rear tray.

The Rear Tray 18 (FIG. 15) is a rectangular frame that includes a U-shaped Channel 44 which nests the Upper and Lower Elbow components 22A & 22B in the retracted position. The Rear Tray 18 is captured in travel within the limits of the Intermediate Slide Rail 16. The Rear Tray 18 is the frame structure which supports additional frame members supporting the two Motors 34A, 34B, Axles 35A, 35B and Spools 28A, 28B for both the vertical and horizontal motion of the Rear Tray 18.

The vertical motion is achieved by the Motor 34A, Axle 35A, Spools 28A hard mounted to the Rear Tray 18. Further, it is this Rear Tray 18 that is connected by means of 2 pins (30B) to the pair of Upper Elbow Arms 22B, used to support the Front Tray 20 and Top Platform 24. For the horizontal motion of the Rear Tray 18, it is the same structure which the Motor 34B, Axle 35B and Spools 28 are mounted to. The Strap 32B for this horizontal motion has its endpoints of attachment at the vehicle's side corner edges of the Stationary Slide Rails 14A and 14B.

Particular to the Rear Tray 18 is the angle in which the U-shaped cross section U-Channel 44 (nesting the Elbow Arms 22A, 22B) is attached to the side members of the frame structure, FIG. 1b. It is this angle which dictates the offset vertical direction of travel for the vertical/diagonal motion of the Front Tray 20 and Top Platform 24. Further, this angle of attachment of the U-Channel 44 to the side frame members allows the direction of vertical travel to follow the side contour of the vehicle 10, rather than simple moving straight up & down. It is this angle that is "clocked" to a particular setting that matches the entire cargo-lift system to a specific vehicle model so that the Elbow Arm Assemblies 22A, 22B, Front Tray 20, and Top Platform 24 do not contact the side of the vehicle.

Figure 14:
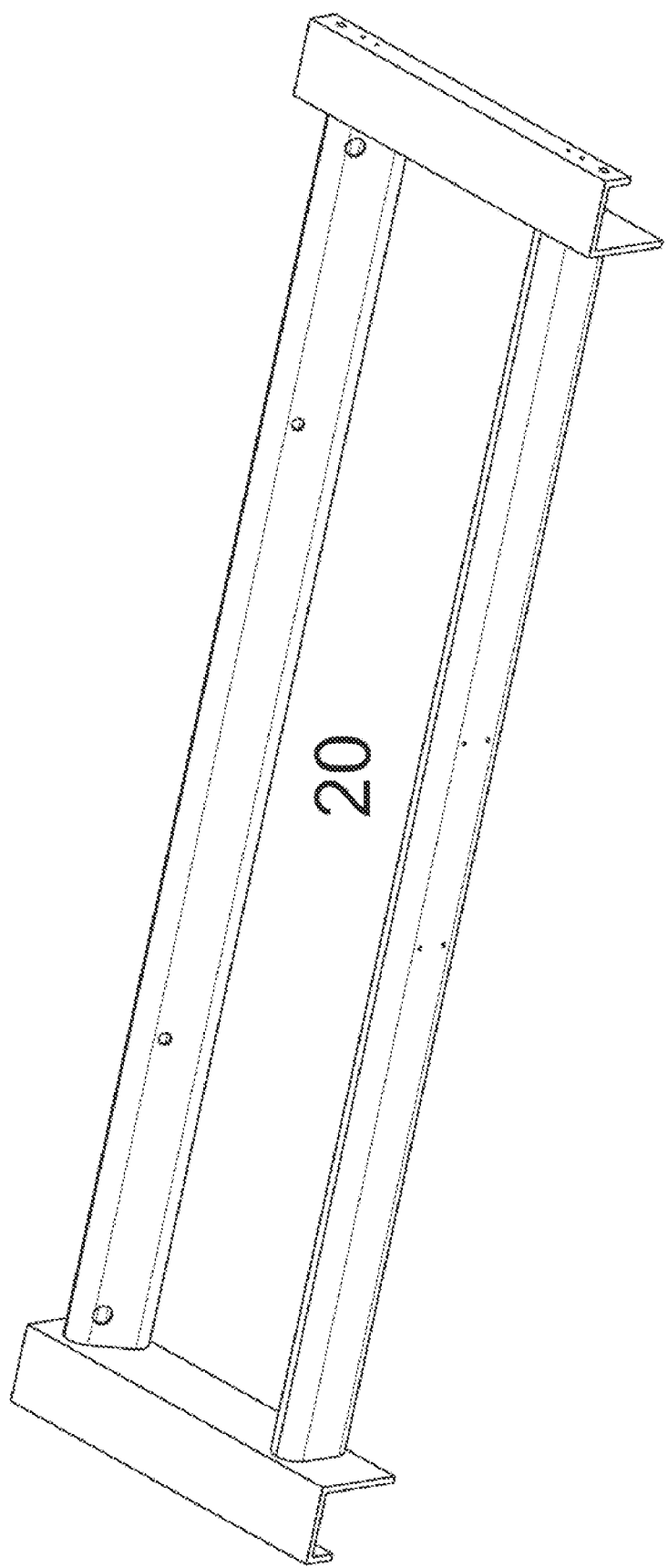
FIG. 14 is a schematic view of the frame for the front tray.
Figure 16:
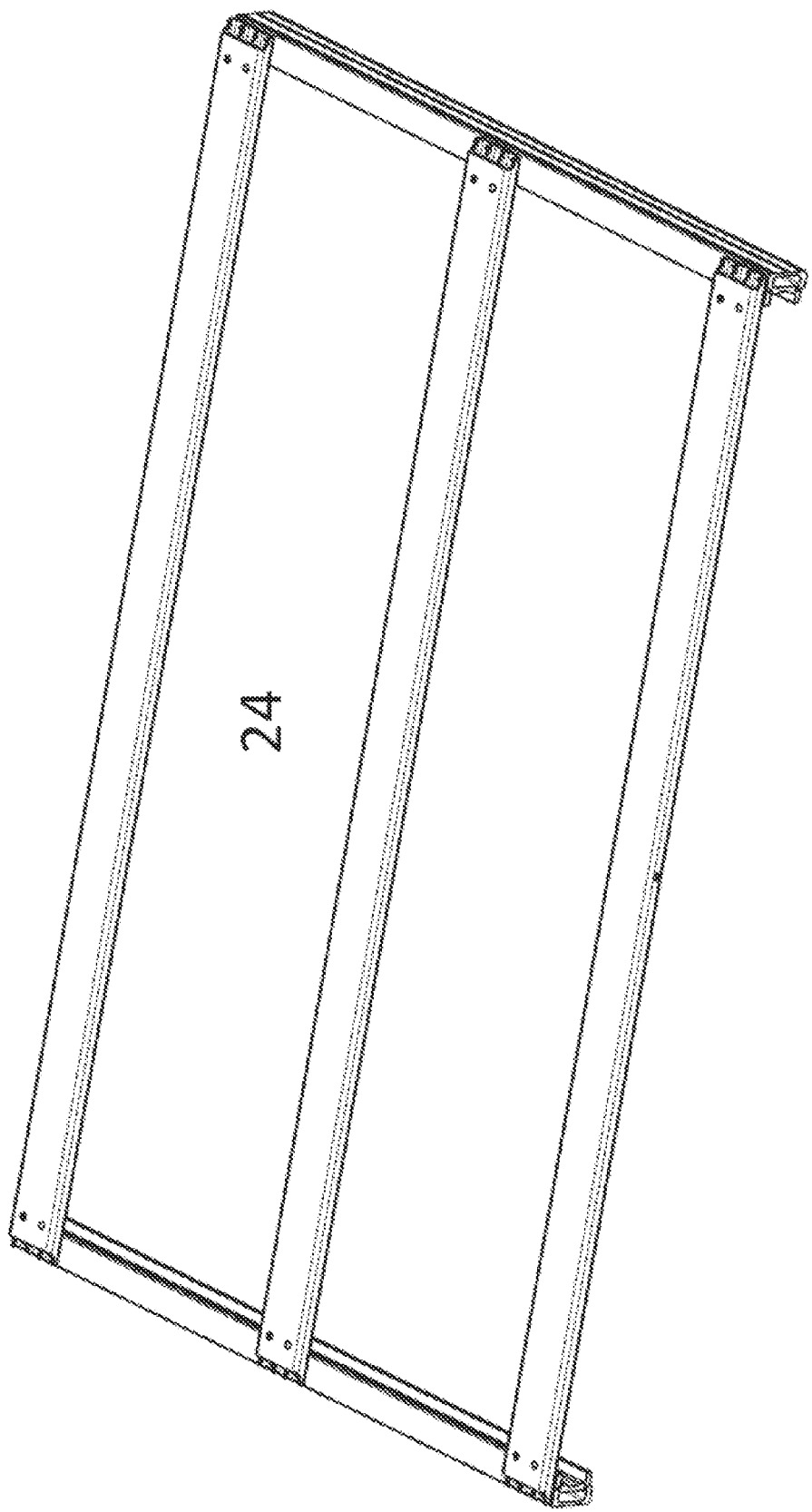
FIG. 16 is a schematic view of the frame for the top platform.

The Front Tray 20 (FIG. 14), is attached to the Lower Elbow Arms 22A by means of two Pins (30A). The Front Tray 20 is a rectangular structure which has its side frame members configured to facilitate a slide rail function so that the Top Platform 24 (FIG. 16) moves in and out over the top of the frame of the Front Tray 20. It is the Front Tray 20 that moves vertically/diagonally by means of the Elbow Arms 22A and 22B and directly supports the Top Platform 24. The Front Tray 20 is also the structure that supports the push-pull system which includes Motor 34C, Axle 35C and Straps 32C for the horizontal motion of the Top Platform 24 in relationship to the Front Tray 20.

The pair of Upper Elbow Arms 22B and Lower Elbow Arms 22A are hinged at the mid-point, 26. The Upper Elbow Arms 22B are attached by pins in the corners of the U-channel 44 and side structural members of the Rear Tray 18 (at 30B). The Lower Elbow Arms 22B are pinned (at 30A) into the Front Tray 20 cross member running next to and parallel to the "clocked" U-channel 44 of the Rear Tray 18.

With reference to FIG. 9, Anti-Sway Pulley System 40 is applied to prevent undesired horizontal sway in the Elbow Arms 22A and 22B. These Elbow Arms 22A and 22B are prevented from undesirable sideways swinging by means of pulleys that are fixed to the ends of the Elbow Arms 22A and 22B with cables. FIG. 9 illustrates the straps in the form of cables 48 configured in a "FIG. 8" arrangement around pulleys 46 fixedly connected to pair of Elbow Arms 22A and 22B at the top and the bottom such that tension created by a sideways force to one arm assembly 22A, 22B is necessarily that same force directly applied to the co-joined arm by means of the strap or cable 48, in its opposite direction creating a canceling effect. The Anti-Sway Pulley System 40 resists forward and rearward sway of the Top Platform 24. FIG. 10 shows a first Anti-Sway Pulley System 40 at the top of the pair of Upper Arms 22B and a second lower Anti-Sway Pulley System 40 at the bottom end of the pair of Lower Arms 22A.

Figure 11:
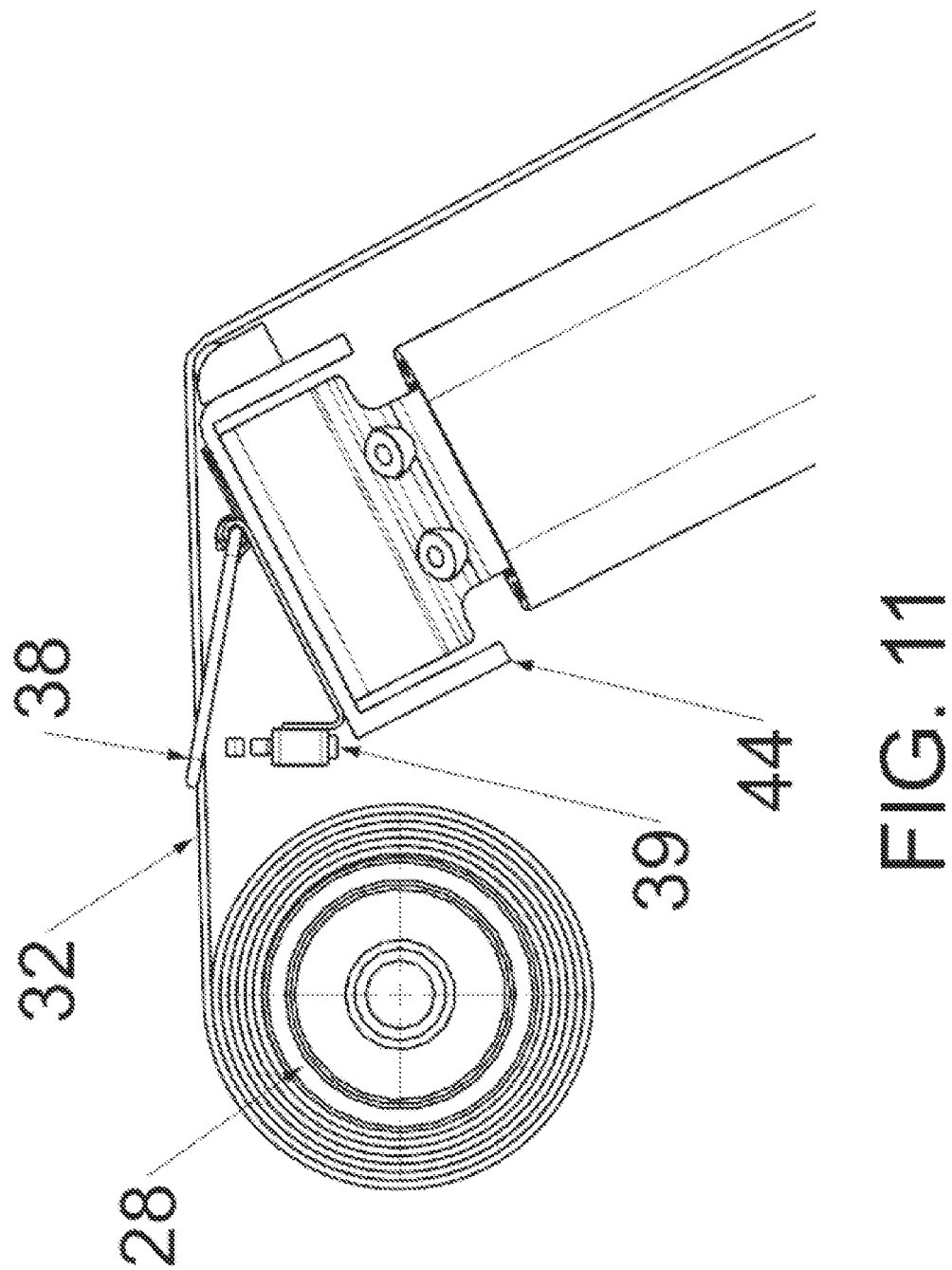
FIG. 11 is a schematic view of an exemplary tension sensor/switch system.

With reference to FIG. 11, a Tension Sensor 38 for the Strap 32A, stops the vertical Motor 34A when the Top Platform 24 reaches the end of its travel at the loading position (FIGS. 1 and 2). In addition, if by circumstance the Top Platform 24 were prevented from its downward motion by some obstruction to its path, causing a slackness in the Straps 32A, this same Tension Sensor 38 stops the motor to prevent unraveling. It is in these scenarios that when the Straps 32A go slack, the spring tension of the Tension Sensor 38 will move to actuate a Switch 39 in the control of the motor supply voltage and turn the voltage off. The Switch 39 can be in communication with the Controller 42, as shown in FIG. 8.

The Anti-Sway Pulley Systems 40, as well as the Tension Sensors 38 for both vertical Cable Straps 32A, are unique features of control to the raising and lowering of the Front Tray 20 and Top Platform 24 by means of the Elbow Arms 22A and 22B. Further the use of a single Axle 35A design for driving both Spools 28A coaxially, ensures the vertical movement of the Front Tray 20 and Top Platform 24, is controlled in a level fashion, left to right. It is the single Axle 35A design which ensures the two Spools 28A run in exact unison for level vertical motion.

The control of each of these three push-pull systems in operating the cargo lift is managed by a Control Unit 42 that can include a series of switches & relays which dictate enabling or lock-out, and the direction of rotation of the respective spools for each of the motor subsystems. The supply voltage can come from the existing vehicle's electrical system 52 or an auxiliary battery if desired.

The Top Platform 24 includes a frame structure (FIG. 16) that is slidable relative to the Front Tray 20. In addition, the Top Platform 24 can include an enclosure 24A to enclose the Cargo Lift 12 when in the retracted position, as illustrated in FIG. 3. As shown in FIG. 8, the Top Platform 24 can include a front, a rear and at least one Side Wall 24a-c. An additional Sidewall Portion 60 can be secured to the Stationary Slide Rail 14 for fully enclosing the Cargo Lift 12 and protecting the Motors 34A-34C and other components from water and other debris and for providing an improved aerodynamic performance and refined appearance.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle cargo lift, comprising:
   a stationary slide adapted to be mounted on a roof of a vehicle;
   an intermediate slide slidably mounted to the stationary slide;
   a rear tray movably supported relative to the intermediate slide; and
   a front tray supported by the rear tray via a pair of elbow arm assemblies that are extendable below the rear tray, the pair of elbow arm assemblies each including an upper link arm connected to the rear tray by a first hinge and a lower link arm pivotally connected to the upper link arm connected to the front tray by a second hinge.

2. The vehicle cargo lift according to claim 1, further comprising a first motorized mechanism operable for extending the intermediate slide relative to the stationary slide and for extending the rear tray relative to the intermediate slide.

3. The vehicle cargo lift according to claim 2, further comprising a second motorized mechanism for lowering the front tray relative to the rear tray by allowing extension of the elbow arm assemblies.

4. The vehicle cargo lift according to claim 3, where the first motorized mechanism includes a first motor drivingly connected to a first axle supported by the rear tray and including a first spool and a first strap for extending and retracting the rear tray relative to the stationary slide.

5. The vehicle cargo lift according to claim 4, where the second motorized mechanism includes a second motor drivingly connected to a second axle supported by the rear tray and including a pair of second spools and a pair of second straps for extending and retracting the front tray, up and down, relative to the rear tray.

6. A vehicle cargo lift, comprising:
   a stationary slide adapted to be mounted on a roof of a vehicle;
   an intermediate slide slidably mounted to the stationary slide;
   a rear tray movably supported relative to the intermediate slide;
   a front tray supported by the rear tray via a pair of elbow arm assemblies that are extendable below the rear tray;
   a first motorized mechanism operable for extending the intermediate slide relative to the stationary slide and for extending the rear tray relative to the intermediate slide;
   a second motorized mechanism for lowering the front tray relative to the rear tray by allowing extension of the elbow arm assemblies; and
   a top platform movably supported by the front tray and a third motorized mechanism operable for extending the top platform relative to the front tray.

7. A vehicle cargo lift, comprising:
   a stationary slide adapted to be mounted on a roof of a vehicle;
   an intermediate slide slidably mounted to the stationary slide;
   a rear tray movably supported relative to the intermediate slide;
   a front tray supported by the rear tray via a pair of elbow arm assemblies that are extendable below the rear tray; and
   an anti-sway system extending between the pair of elbow arm assemblies.

8. A vehicle cargo lift, comprising:
   a stationary slide adapted to be mounted on a roof of a vehicle;
   an intermediate slide slidably mounted to the stationary slide;
   a rear tray movably supported relative to the intermediate slide; and
   a front tray supported by the rear tray via a pair of elbow arm assemblies that are extendable below the rear tray, wherein the rear tray includes a U-shaped channel for nesting the pair of elbow arm assemblies therein.

9. The vehicle cargo lift according to claim 1, wherein the pair of elbow arm assemblies are extendable at an angle downward and laterally outward from the rear tray.

10. The vehicle cargo lift according to claim 6, further comprising
    a control unit for activating each of the first motorized mechanism, the second motorized mechanism and the third motorized mechanism for moving the top platform between extended and retracted positions.

11. A vehicle cargo lift, comprising:
    a stationary slide adapted to be mounted on a roof of a vehicle;
    an intermediate slide slidably mounted to the stationary slide;
    a rear tray movably supported relative to the intermediate slide, wherein the rear tray is movable by a first spool and strap system driven by a first motor; and a front tray supported by the rear tray via a pair of elbow arm assemblies that are extendable below the rear tray, wherein the front tray is movable relative to the rear tray by a second spool and strap system driven by a second motor, the pair of elbow arm assemblies each including an upper link arm connected to the rear tray by a first hinge and a lower link arm pivotally connected to the upper link arm connected to the front tray by a second hinge.

12. The vehicle cargo lift according to claim 11, further comprising a top platform movably supported by the front tray and a third spool and strap system driven by a third motor operable for extending the top platform relative to the front tray.

13. The vehicle cargo lift according to claim 11, further comprising an anti-sway system extending between the pair of elbow arm assemblies.

14. The vehicle cargo lift according to claim 11, wherein the rear tray includes a U-shaped channel for nesting the pair of elbow arm assemblies therein.

15. The vehicle cargo lift according to claim 11, wherein the pair of elbow arm assemblies are extendable at an angle downward and laterally outward from the rear tray.

16. The vehicle cargo lift according to claim 12, further comprising a control unit for activating each of the first motor, the second motor and the third motor for moving the top platform between extended and retracted positions.

17. The vehicle cargo lift according to claim 16, further comprising a tension sensing system for sensing slack in a strap of the first and second spool and strap systems.

18. A vehicle cargo lift, comprising:
a slide system adapted for mounting to a roof of a vehicle and for movably supporting a lifting system and a top platform for horizontal movement relative to the roof, wherein the lifting system is extendable below the slide system, wherein the top platform is movably supported to move diagonally including simultaneously both vertically downward and horizontally alongside of the vehicle while maintaining the top platform in a horizontal position.

19. The vehicle cargo lift according to claim 18, wherein the slide system includes a first spool and strap system driven by a first motor operable for horizontally extending the slide system and the lifting system includes a second spool and strap system driven by a second motor for diagonally extending the lifting system downward and horizontally alongside of the vehicle.

20. The vehicle cargo lift according to claim 19, further comprising a control unit for activating each of the first motor and, the second motor for moving the top platform between extended and retracted positions.

* * * * *